UNITED STATES PATENT OFFICE.

WILLIS J. ROUSSEL, OF NEW ORLEANS, LOUISIANA.

BRIQUET.

SPECIFICATION forming part of Letters Patent No. 719,047, dated January 27, 1903.

Application filed April 25, 1902. Serial No. 104,712. (No specimens.)

*To all whom it may concern:*

Be it known that I, WILLIS J. ROUSSEL, a citizen of the United States, residing at New Orleans, in the parish of Orleans and State of Louisiana, have invented certain new and useful Improvements in Briquets; and I do hereby declare the following to be a full, clear, and exact description of the invention, such as will enable others skilled in the art to which it appertains to make and use the same.

My invention relates to improvements in briquets; and the object of my invention is to produce a cheap and efficient artificial fuel and at the same time utilizing waste products.

In carrying out my invention I take ordinary garbage or house refuse and mix it with charcoal and resin in the following proportions: charcoal, fifteen per cent.; resin, ten per cent., and garbage, seventy-five per cent., the garbage having been soaked in crude petroleum, which is now produced in large quantities in this vicinity. Instead of charcoal fine coal may be used. The garbage or similar waste material is first dried in any suitable manner and then pulverized or chopped. It is then placed in vats filled with crude petroleum, and after it has become thoroughly impregnated therewith it is transferred to a mixing-vat and the charcoal and resin added. After the materials are well mixed the resulting mass is pressed into briquets of the desired shape and size in molds, which may be either hot or cold. By the process of pressing the excess of oil is removed and all cavities in the mass filled up, obviating to a large degree the formation of gases of decomposition, the result being a firm compact briquet admirably suited for fuel purposes.

I find that the use of charcoal in the briquets causes them to last longer when burning and also to burn with a fine glow. Also the use of resin renders it easier to start a fire with the briquets, since without this ingredient it would be necessary to start a separate fire to ignite the briquets. In some cases, however, as for use under boilers, this ingredient may be omitted.

A better result is obtained if the oil in which the dried garbage or other waste product is soaked is heated to a rather high temperature, as this seems to increase the absorptive properties of the dried mass.

Instead of or mixed with the garbage I may use any of the common waste products which are now of little or no value and are often a source of expense, such as sawdust, excelsior, bagasse, water hyacinths, straw, rice-shells, corn-shucks, rags, waste paper, &c. Of course I do not mean that any waste material whatever—such as furnace-slag, for example—could be used instead of garbage, as my invention is restricted to combustible waste materials. I am thus enabled to use waste products and cheap fuel materials to produce excellent fuel-briquets, which may be used in any desired way for heating purposes.

Having thus described my invention, what I claim as new, and desire to secure by Letters Patent of the United States, is—

A briquet composed of seventy-five per cent. of garbage soaked in hot crude petroleum, fifteen per cent. of charcoal and ten per cent. of resin, the whole mass being pressed into briquets under the influence of heat.

In testimony whereof I affix my signature in presence of two witnesses.

WILLIS J. ROUSSEL.

Witnesses:
   LOUIS CIPRIANI,
   EDA MEUNIER.